(12) United States Patent
Takata et al.

(10) Patent No.: US 10,935,007 B2
(45) Date of Patent: Mar. 2, 2021

(54) GEOTHERMAL TURBINE

(71) Applicant: Mitsubishi Hitachi Power Systems, Ltd., Yokohama (JP)

(72) Inventors: Ryo Takata, Tokyo (JP); Mitsuyoshi Tsuchiya, Yokohama (JP); Yu Shibata, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/475,909

(22) PCT Filed: Dec. 19, 2017

(86) PCT No.: PCT/JP2017/045433
§ 371 (c)(1),
(2) Date: Jul. 3, 2019

(87) PCT Pub. No.: WO2018/146946
PCT Pub. Date: Aug. 16, 2018

(65) Prior Publication Data
US 2019/0345918 A1 Nov. 14, 2019

(30) Foreign Application Priority Data

Feb. 10, 2017 (JP) .............................. JP2017-022699

(51) Int. Cl.
*F01D 1/02* (2006.01)
*F03G 7/04* (2006.01)

(52) U.S. Cl.
CPC .................. *F03G 7/04* (2013.01); *F01D 1/02* (2013.01); *F05D 2210/12* (2013.01); *F05D 2220/31* (2013.01)

(58) Field of Classification Search
CPC .......... F03G 7/04; F01D 1/02; F05D 2210/12; F05D 2220/31
See application file for complete search history.

(56) References Cited

U.S. PATENT DOCUMENTS

| | | | |
|---|---|---|---|
| 7,488,153 B2* | 2/2009 | Reigl .................... | F01D 5/084 415/177 |
| 2007/0071596 A1* | 3/2007 | Ryser .................... | F04B 19/006 415/172.1 |
| 2014/0020359 A1* | 1/2014 | Mimura .................. | F01D 11/08 60/39.182 |

FOREIGN PATENT DOCUMENTS

| | | |
|---|---|---|
| GB | 929103 A | 6/1963 |
| JP | S52-138103 U | 10/1977 |

(Continued)

OTHER PUBLICATIONS

Office Action dated Dec. 24, 2019, issued in counterpart JP Application 2017-022699, with English translation (8 pages).

(Continued)

*Primary Examiner* — Shafiq Mian
(74) *Attorney, Agent, or Firm* — Westerman, Hattori, Daniels & Adrian, LLP

(57) ABSTRACT

A geothermal turbine includes: a rotor; a casing which houses the rotor; a plurality of rotor blades disposed around the rotor; a plurality of stationary vanes supported on the casing; at least one seal portion disposed in a gap between the rotor and the casing at an upstream side of a first-stage rotor blade of the plurality of rotor blades so as to seal leakage steam which flows out inward in a radial direction of the rotor from between a first-stage stationary vane of the plurality of stationary vanes and the first-stage rotor blade; and a steam passage configured to extract a part of steam after passing the first-stage stationary vane and discharge the part of steam to the gap through an interior of the first-stage stationary vane.

5 Claims, 7 Drawing Sheets

(56) References Cited

FOREIGN PATENT DOCUMENTS

| JP | S58-202301 A | 11/1983 |
|----|---|---|
| JP | S59-184301 U | 12/1984 |
| JP | S60-069214 A | 4/1985 |
| JP | 3046907 B2 | 5/2000 |
| JP | 2014-020319 A | 2/2014 |
| JP | 2015-031174 A | 2/2015 |
| JP | 2015-31175 A | 2/2015 |
| WO | 2015/104695 A1 | 7/2015 |

OTHER PUBLICATIONS

Notification of Transmittal of Translation of the International Preliminary Report on Patentability (Form PCT/IB/338) issued in counterpart International Application No. PCT/JP2017/045433 dated Aug. 22, 2019, with Forms PCT/IB/326, PCT/IB/373 and PCT/ISA/237, with English translation. (14 pages).

International Search Report dated Mar. 6, 2018, issued in counterpart application No. PCT/JP2017/045433, with English translation. (16 pages).

* cited by examiner

GEOTHERMAL TURBINE

TECHNICAL FIELD

The present disclosure relates to a geothermal turbine.

BACKGROUND ART

In typical geothermal flash power generation, a geothermal turbine is driven with steam obtained from a geothermal source (production well).

High-temperature hot water ejected from a geothermal source contains a high volume of substances such as calcium and silica. Thus, if these substances are carried to the turbine together with mist that cannot be removed completely with a separator and adhere to the first-stage stationary vanes of the turbine, scales such as calcium carbonate and amorphous silica are deposited on the first-stage stationary vanes. Deposition of scales causes the flow passage between first-stage stationary vanes to narrow, which leads to deterioration of the turbine performance.

Patent Document 1 discloses a geothermal turbine for suppressing deposition of scales on the first-stage stationary vanes. The geothermal turbine according to Patent Document 1 is configured such that a pump circulates a cooling medium between the first-stage stationary vanes and the subsequent-stage stationary vanes downstream of the first-stage stationary vanes to cool the first-stage stationary vanes, thereby suppressing deposition of scales on the first-stage stationary vanes.

CITATION LIST

Patent Literature

Patent Document 1: JP2015-31174A

SUMMARY

Problems to be Solved

While it is possible to suppress deposition of scales on the first-stage stationary vanes with the geothermal turbine described in Patent Document 1, the turbine configuration is complex because it is necessary to provide a pump or the like to circulate the cooling medium between the first-stage stationary vanes and the subsequent-stage stationary vanes.

At least one embodiment of the present invention was made in view of the above conventional problem. An object of at least one embodiment of the present invention is to provide a geothermal turbine capable of suppressing deposition of scales on the first-stage stationary vanes with a simple configuration.

Solution to the Problems (1) A geothermal turbine according to at least one embodiment of the present invention includes: a rotor; a casing which houses the rotor; a plurality of rotor blades disposed around the rotor; a plurality of stationary vanes supported on the casing; at least one seal portion disposed in a gap between the rotor and the casing at an upstream side of a first-stage rotor blade of the plurality of rotor blades so as to seal leakage steam which flows out inward in a radial direction of the rotor from between a first-stage stationary vane of the plurality of stationary vanes and the first-stage rotor blade; and a steam passage configured to extract a part of steam after passing the first-stage stationary vane and discharge the part of steam to the gap through an interior of the first-stage stationary vane.

According to findings of the present inventors, steam after passing the first-stage stationary vane in the axial direction has a lower temperature than the first-stage stationary vane. This may be because the vane body portion of the first-stage stationary vane receives heat input and the outer race and the inner race of the first-stage stationary vane receive heat input from the contact portion with the casing, while the temperature of the main flow of the steam (axial directional steam flow that passes the stationary vane and the rotor blade alternately) decreases toward the downstream side.

Thus, as described in the above (1), by providing the steam passage configured to extract a part of steam after passing the first-stage stationary vane and discharge the part of steam to the gap through the interior of the first-stage stationary vane, it is possible to let the steam passing the interior of the first-stage stationary vane function as cooling steam, and cool the first-stage stationary vane. Accordingly, it is possible to suppress drying of the surface of the first-stage stationary vane, and suppress deposition of scales due to repetition of drying and moisturizing of the first-stage stationary vane.

Furthermore, in a typical geothermal turbine, the pressure in the gap is lower than the pressure in the space section between the first-stage rotor blade and the second-stage stationary vane in the casing, and thus it is possible to extract a part of steam after passing the first-stage stationary vane in the axial direction to the gap through the interior of the first-stage stationary vane (through the through hole) without providing an additional pump or the like. Thus, it is possible to cool the first-stage stationary vane and suppress deposition of scales on the first-stage stationary vane with a simple configuration.

(2) In some embodiments, in the geothermal turbine according to the above (1), the steam passage has a steam outlet disposed at a downstream side of at least one of the at least one seal portion with respect to a flow of the leakage steam.

With the above geothermal turbine (2), there is a pressure difference across at least one of the at least one seal portion, and thus it is possible to increase the pressure difference between the pressure in the gap and the pressure in the space section between the first-stage rotor blade and the second-stage stationary vane, of the space inside the casing. Thus, it is possible to supply steam stably to the steam passage even if the operational conditions change, and cool the first-stage stationary vane effectively.

(3) In some embodiments, in the geothermal turbine according to the above (2), each of the plurality of stationary vanes includes a vane body portion and an inner race positioned at an inner side of the vane body portion in the radial direction, the at least one seal portion includes an inner race seal portion disposed between the rotor and the inner race of the first-stage stationary vane, and the steam passage has a steam outlet disposed at a downstream side of the inner race seal portion with respect to the flow of the leakage steam.

With the above geothermal turbine (3), there is a pressure difference across the inner race seal portion, and thus it is possible to increase the pressure difference between the pressure in the gap and the pressure in the space section between the first-stage rotor blade and the second-stage stationary vane, of the space inside the casing. Thus, it is possible to supply steam stably to the steam passage even if the operational conditions change, and cool the first-stage stationary vane effectively.

(4) In some embodiments, in the geothermal turbine according to any one of the above (1) to (3), each of the plurality of stationary vanes includes a vane body portion and an inner race positioned at an inner side of the vane body portion in the radial direction, and the steam passage has a steam outlet disposed on a boundary between the casing and the inner race of the first-stage stationary vane.

With the above geothermal turbine (4), it is possible to discharge steam after passing through the interior of the first-stage stationary vane to the gap by utilizing the boundary portion (coupling portion) between the casing and the inner race of the first-stage stationary vane, and thus it is possible to simplify the configuration of the steam passage, and suppress deposition of scales on the first-stage stationary vane at low cost.

(5) In some embodiments, in the geothermal turbine according to any one of the above (1) to (4), each of the plurality of stationary vanes includes a vane body portion and an inner race positioned at an inner side of the vane body portion in the radial direction, and the at least one seal portion includes an inner race seal portion disposed between the rotor and the inner race of the first-stage stationary vane, the inner race seal portion includes a rotor facing surface which faces the rotor, an upstream surface positioned at an upstream side of the rotor facing surface with respect to a flow direction of the leakage steam, and a downstream surface positioned at a downstream side of the rotor facing surface with respect to a flow of the leakage steam, and the steam passage has a steam outlet disposed on the downstream surface.

With the above geothermal turbine (5), there is a pressure difference across the inner race seal portion, and thus it is possible to increase the pressure difference between the pressure in the gap and the pressure in the space section between the first-stage rotor blade and the second-stage stationary vane, of the space inside the casing. Thus, it is possible to supply steam stably to the steam passage even if the operational conditions change, and cool the first-stage stationary vane effectively.

(6) In some embodiments, in the geothermal turbine according to any one of the above (1) to (5), each of the plurality of stationary vanes includes a vane body portion, an inner race positioned at an inner side of the vane body portion in the radial direction, and an outer race positioned at an outer side of the vane body portion in the radial direction, and at least one of the inner race of the first-stage stationary vane or the outer race of the first-stage stationary vane has an annular hollow section inside thereof.

With the above geothermal turbine (6), by providing the annular hollow section inside at least one of the inner race or the outer race of the first-stage stationary vane, it is possible to suppress heat input to the vane body portion of the first-stage stationary vane from the casing. Accordingly, it is possible to suppress a temperature increase of the first-stage stationary vane, and suppress deposition of scales on the first-stage stationary vane.

Advantageous Effects

According to at least one embodiment of the present invention, it is possible to provide a geothermal turbine capable of suppressing deposition of scales on the first-stage stationary vanes with a simple configuration.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
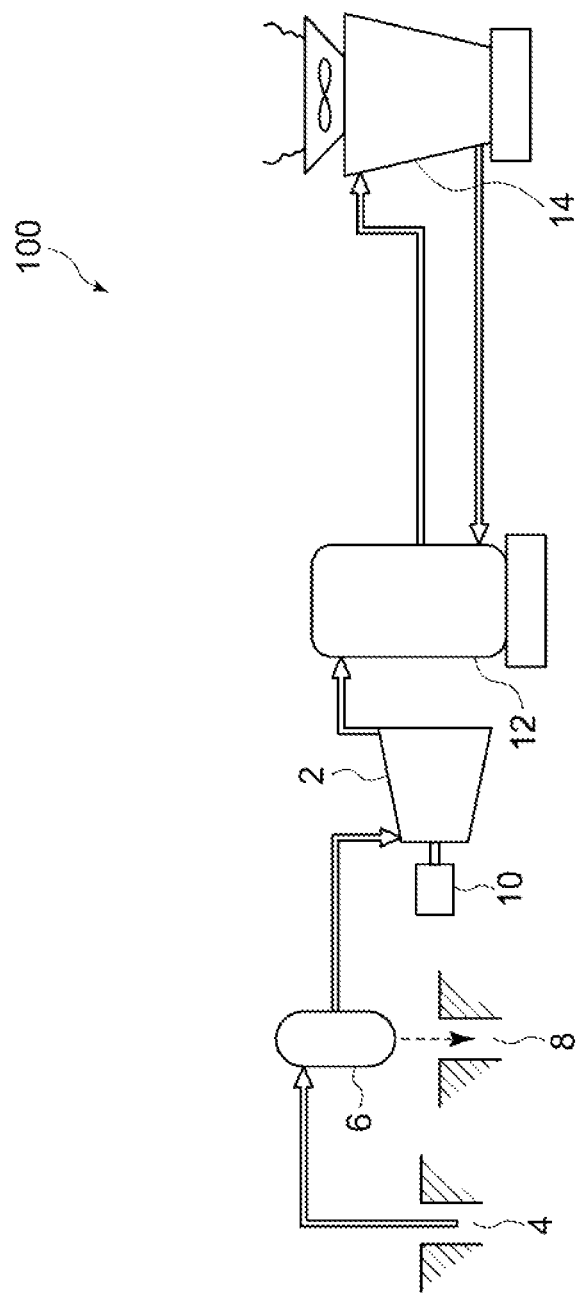
FIG. 1 is a diagram showing a geothermal power generation system 100 as an application example of a geothermal turbine 2 according to the present invention.

FIG. 1 is a diagram showing a geothermal power generation system 100 as an application example of a geothermal turbine 2 according to the present invention.

The geothermal power generation system 100 includes a production well 4 which generates high-temperature and high-pressure hot water and steam from a heat source deep under the ground, a separator 6 which separates hot water and steam obtained from the production well, a reinjection well 8 to which hot water separated by the separator 6 is returned, a geothermal turbine 2 driven by steam separated by the separator 6, a generator 10 connected to the geothermal turbine 2, and a condenser 12 which turns steam after passing the geothermal turbine 2 into warm water, and a cooling tower 14 which cools warm water generated by the condenser 12.

Figure 2:
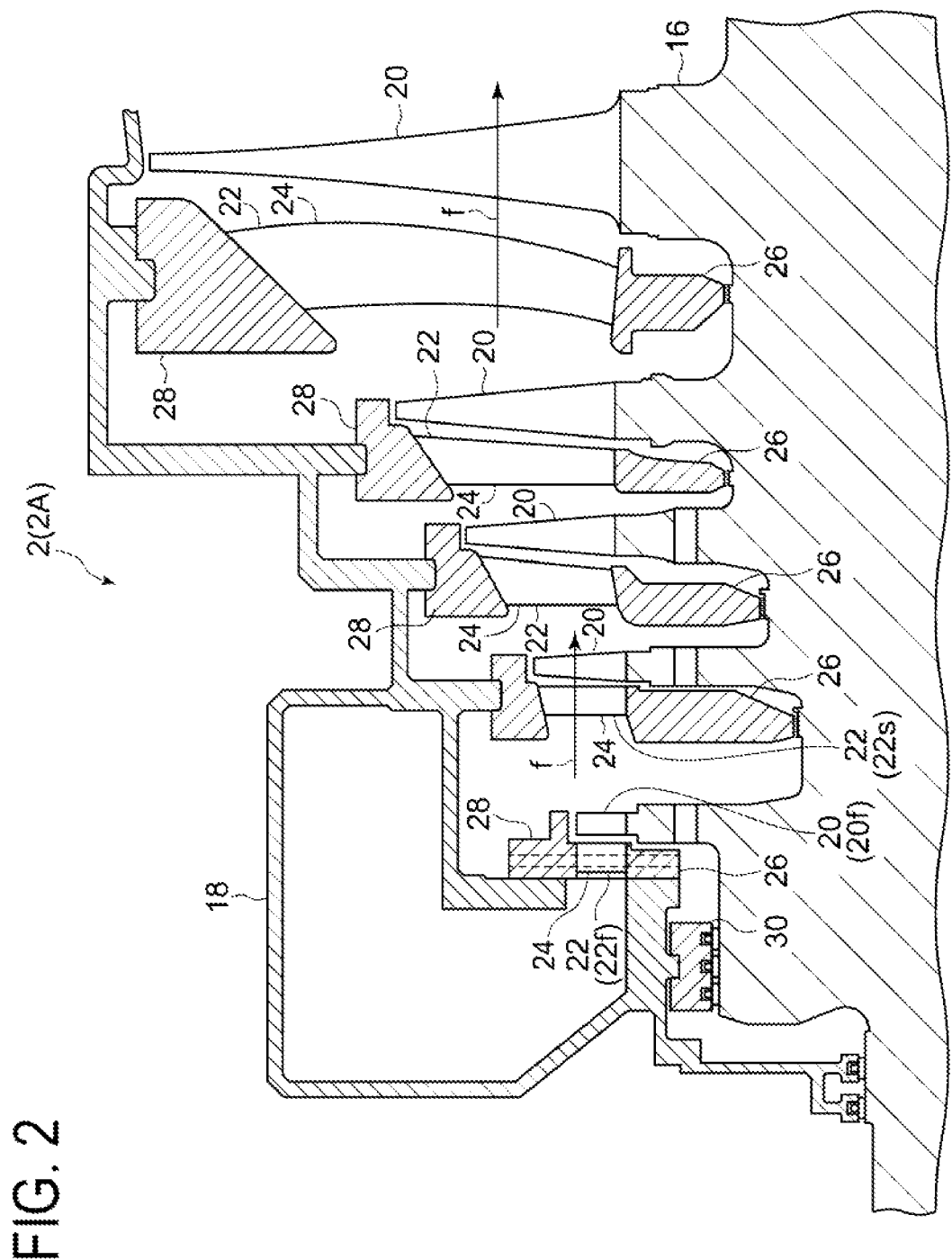
FIG. 2 is a cross-sectional view showing the schematic configuration of the geothermal turbine 2.

FIG. 2 is a cross-sectional view showing the schematic configuration of the geothermal turbine 2.

As depicted in FIG. 2, the geothermal turbine 2 includes a rotor 16, a casing 18 housing the rotor 16, a plurality of rotor blades 20 disposed around the rotor 16, and a plurality of stationary vanes 22 supported on the casing 18.

Each of the stationary vanes 22 includes a vane body portion 24, an inner race 26 positioned inside the vane body portion 24 in the radial direction of the rotor 16, and an outer race 28 positioned on the outer side of the vane body portion 24 in the radial direction of the rotor 16. At the first-stage stationary vane 22f of the plurality of stationary vanes 22, the inner race 26 and the outer race 28 are coupled to the casing 18. At a stationary vane 22 other than the first-stage stationary vane 22f of the plurality of stationary vanes 22, only the outer race 28 is joined to the casing 18.

Hereinafter, unless otherwise stated, the radial direction of the rotor 16 is referred to as merely "radial direction", the axial direction of the rotor 16 is referred to as merely "axial direction", and the circumferential direction of the rotor 16 is referred to as merely "circumferential direction". Further, unless otherwise stated, the upstream side and the downstream side in the flow direction of the main flow 'f' flowing through the casing 18 (steam flow in the axial direction alternately passing through the stationary vanes 22 and the rotor blades 20) are referred to as merely "upstream" and "downstream" respectively.

Figure 3:
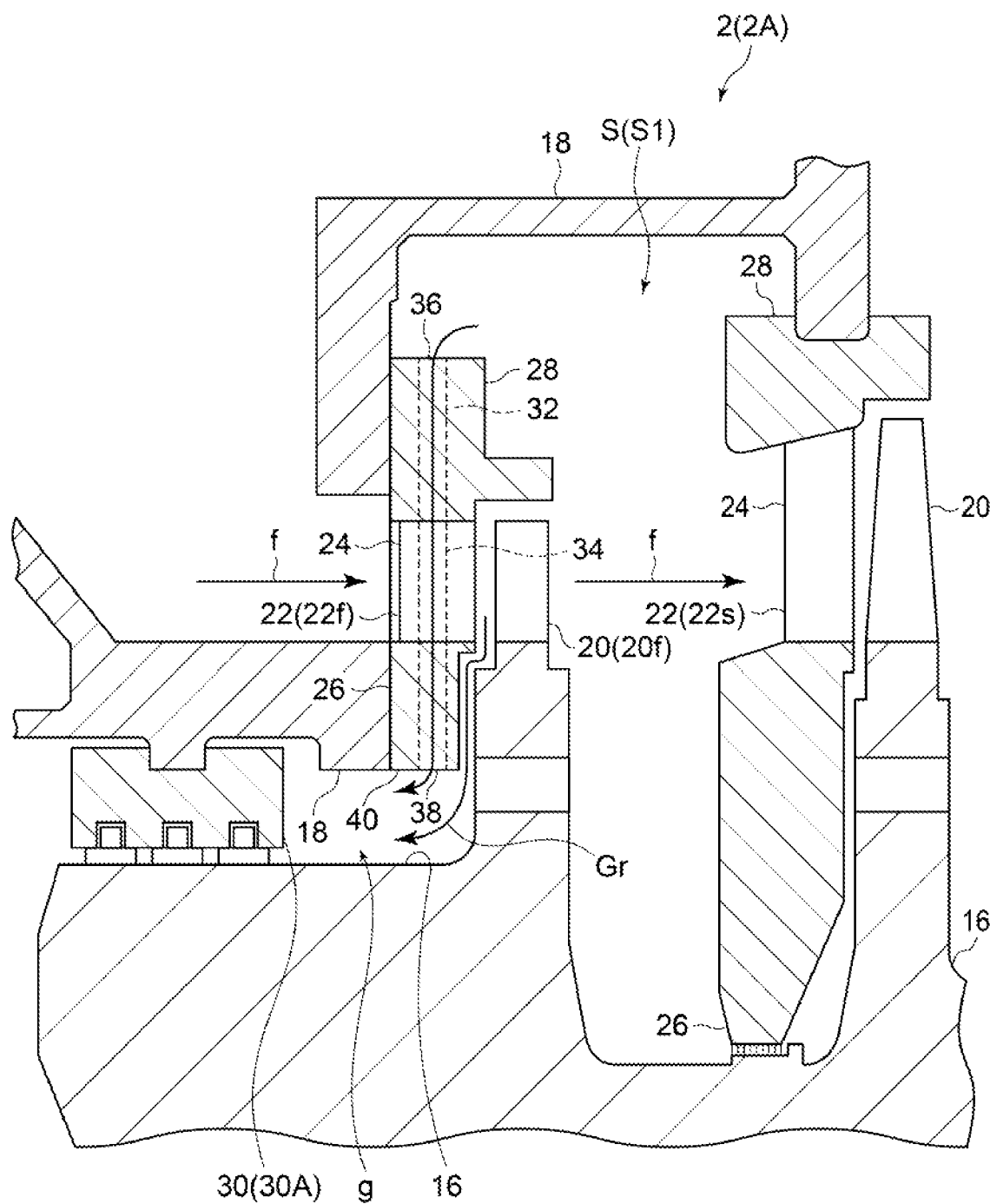
FIG. 3 is a cross-sectional view showing the configuration near a seal portion 30 of a geothermal turbine 2 (2A) according to an embodiment.

FIG. 3 is a cross-sectional view showing the configuration near a seal portion 30 of the geothermal turbine 2 (2A) according to an embodiment.

As depicted in FIG. 3, the geothermal turbine 2 includes at least one seal portion 30 (30A) disposed in the gap 'g' between the rotor 16 and the casing 18 at the upstream side of the first-stage rotor blade 20f in the axial direction, so as to seal leakage steam Gr flowing out inward in the radial direction of the rotor 16 from between the first-stage stationary vane 22f of the plurality of stationary vanes 22 and the first-stage rotor blade 20f of the plurality of rotor blades 20. The seal portion 30 has an annular structure, and forms a labyrinth structure between the inner peripheral surface of the seal portion 30 and the outer peripheral surface of the rotor 16.

Furthermore, the geothermal turbine 2 includes a steam passage 32 configured to extract a part of steam after passing the first-stage stationary vane 22f and extract the part of steam to the gap 'g' through the interior of the first-stage stationary vane 22f. In the depicted illustrative embodiment, the first-stage stationary vane 22f has a through hole 34 formed through the vane body portion 24 in the radial direction. The steam passage 32 has a steam inlet 36 disposed on the outer race 28 of the first-stage stationary vanes 22f, and a steam outlet 38 disposed on an inner peripheral surface 40 of the inner race 26 of the first-stage stationary vanes 22f. The steam passage 32 is configured to extract steam in a space section S1 between the first-stage rotor blade 20f of the plurality of rotor blades 20 and the second-stage stationary vane 22s of the plurality of stationary vanes 22, of the space S inside the casing 18, from the steam inlet 36, and discharge the steam to the gap 'g' from the steam outlet 38 through the through hole 34.

According to findings of the present inventors, steam after passing the first-stage stationary vane 22f in the axial direction has a lower temperature than the first-stage stationary vane 22f. This may be because the vane body portion 24 of the first-stage stationary vane 22f receives heat input from the main flow 'f' and the outer race 28 and the inner race 26 of the first-stage stationary vane 22f receives heat input from the contact portion with the casing 18, while the temperature of the main flow 'f' decreases toward the downstream side.

Thus, by providing the steam passage 32 configured to extract a part of steam after passing the first-stage stationary vane 22f in the axial direction and discharge the part of steam to the gap 'g' through the interior of the first-stage stationary vane 22f, it is possible to let the steam passing the interior of the first-stage stationary vane 22f function as cooling steam, and cool the first-stage stationary vane 22f. Accordingly, it is possible to suppress drying of the surface of the first-stage stationary vane 22f, and suppress deposition of scales due to repetition of drying and moisturizing of the first-stage stationary vane 22f.

Furthermore, in a typical geothermal turbine, the pressure in the gap 'g' is lower than the pressure in the space section S1 between the first-stage rotor blade 20f and the second-stage stationary vane 22s in the casing 18, and thus it is possible to guide a part of steam after passing the first-stage stationary vane 22f in the axial direction to the gap 'g' through the interior of the first-stage stationary vane 22f (through the through hole 34) without providing an additional pump or the like. Thus, it is possible to cool the first-stage stationary vane 22f and suppress deposition of scales on the first-stage stationary vane 22f with a simple configuration.

Figure 4:
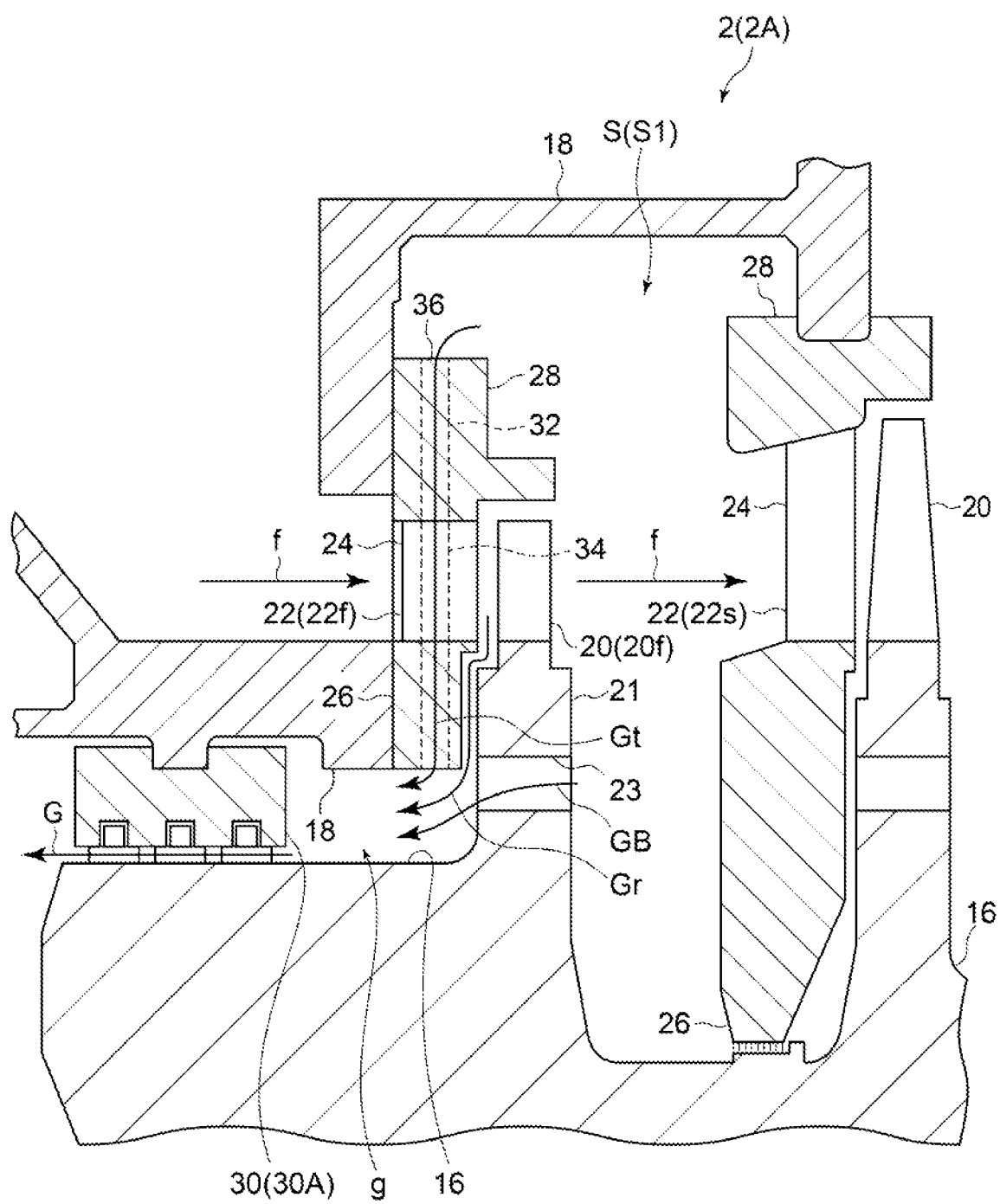
FIG. 4 is a cross-sectional view showing the configuration near a seal portion 30 of a geothermal turbine 2 (2A) according to an embodiment.

Further, in the embodiment depicted in FIG. 4, the rotor 16 includes a disc portion 21 to which the first-stage rotor blade 20f is fixed, and the disc portion 21 has a balance hole 23 formed through in the axial direction. According to findings of the present inventors, as depicted in FIG. 4, the flow rate of the leakage steam G passing through the seal portion 30A is equal to the sum of the flow rate of the leakage steam GB flowing into the gap 'g' via the balance hole 23, the flow rate of the leakage steam Gr, and the steam Gt guided to the gap 'g' through the interior of the first-stage stationary vane 22f (hereinafter, referred to as "cooling steam Gt"), but the performance of the geothermal turbine does not substantially deteriorate due to extraction of the cooling steam Gt from the space section S1 because presence or absence of the cooling steam Gt does not substantially change the flow rate of the leakage steam G.

Figure 5:
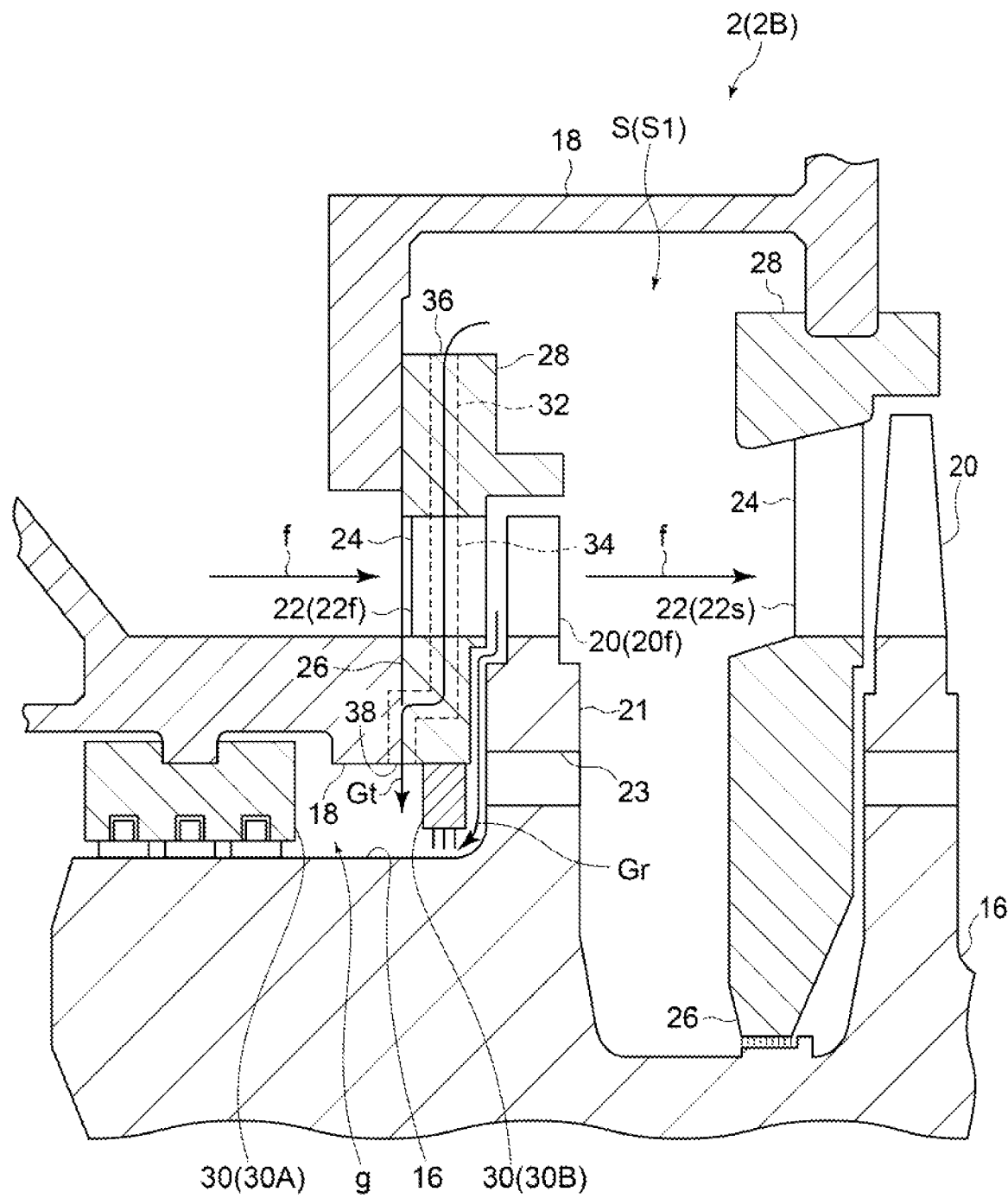
FIG. 5 is a cross-sectional view showing the configuration near a seal portion 30 of a geothermal turbine 2 (2B) according to an embodiment.

FIG. 5 is a cross-sectional view showing the configuration near a seal portion 30 of the geothermal turbine 2 (2B) according to an embodiment. The basic configuration of the geothermal turbine 2 (2B) is similar to the basic configuration of the geothermal turbine 2 (2A), and the same reference numerals as the above mentioned reference numerals are affixed and the description is not repeated. The configuration of the steam outlet of the steam passage 32 of the geothermal turbine 2 (2B) is different from that of the geothermal turbine 2 (2A).

With the geothermal turbine 2 (2B) depicted in FIG. 5, the at least one seal portion 30 includes a seal portion 30A, and an inner race seal portion 30B disposed between the inner race 26 of the first-stage stationary vane 22f and the rotor 16 so as to seal leakage steam Gr that flows inward in the radial direction of the rotor 16 from between the first-stage stationary vane 22f and the first-stage rotor blade 20f. Further, the steam outlet 38 of the steam passage 32 is disposed at the downstream side of the inner race seal portion 30B with respect to the flow of the leakage steam Gr.

With the above configuration, there is a pressure difference across the inner race seal portion 30B, and thus it is possible to increase the pressure difference between the pressure in the gap 'g' and the pressure in the space section S1 between the first-stage rotor blade 20f and the second-stage stationary vane 22s. Thus, it is possible to supply steam stably to the steam passage 32 even if the operational conditions change, and cool the first-stage stationary vane 22f effectively.

Further, in the embodiment depicted in FIG. 5, the steam outlet 38 of the steam passage 32 is disposed on the boundary between the casing 18 and the inner race 26 of the first-stage stationary vane 22f.

With the above configuration, it is possible to discharge steam after passing through the interior of the first-stage stationary vane 22f to the gap 'g' by utilizing the boundary portion (coupling portion) between the casing 18 and the inner race of the first-stage stationary vane 22f, and thus it is possible to simplify the configuration of the steam passage 32, and suppress deposition of scales on the first-stage stationary vane 22f at low cost.

Figure 6:
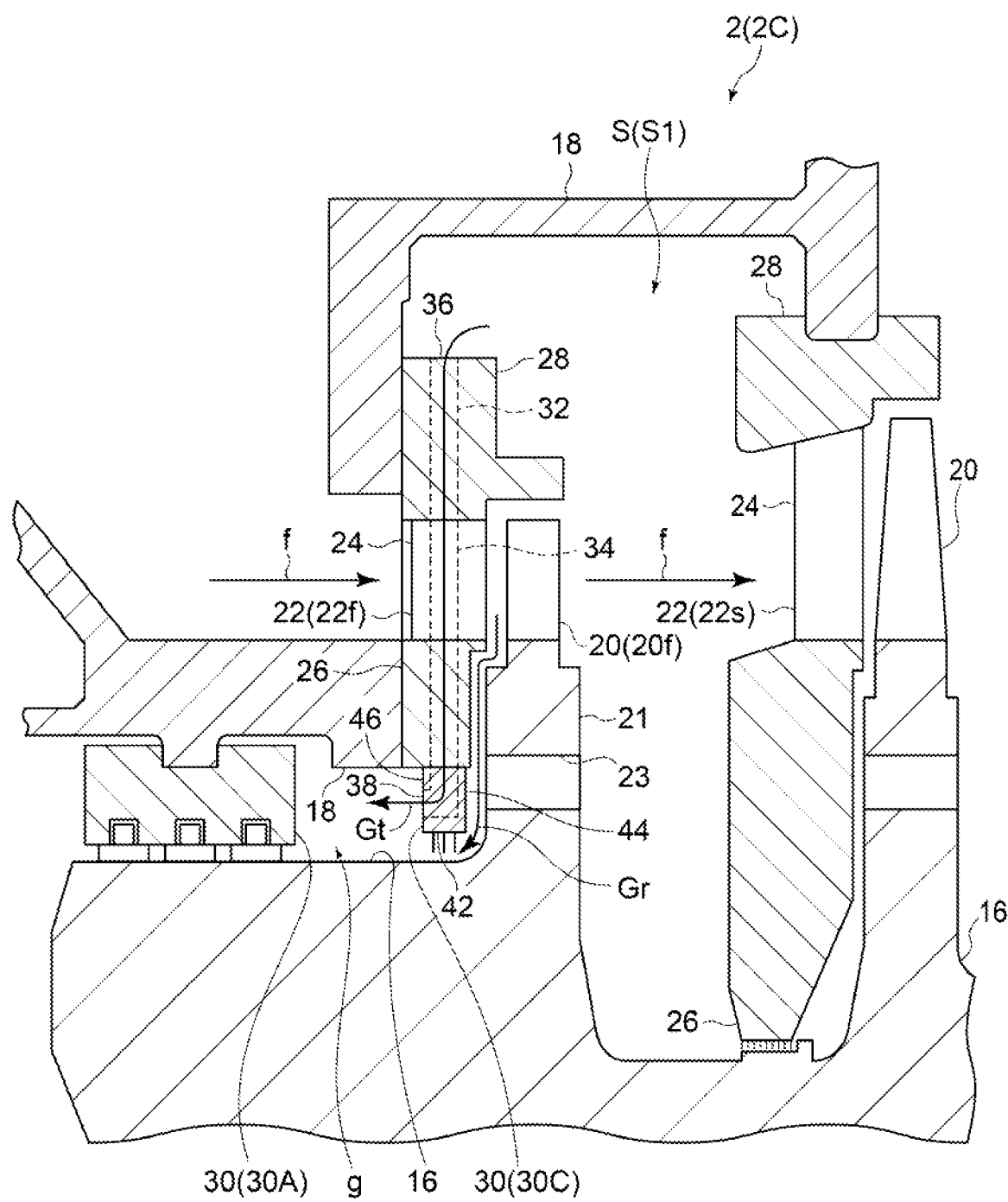
FIG. 6 is a cross-sectional view showing the configuration near a seal portion 30 of a geothermal turbine 2 (2C) according to an embodiment.

FIG. 6 is a cross-sectional view showing the configuration near a seal portion 30 of the geothermal turbine 2 (2C) according to an embodiment. The basic configuration of the geothermal turbine 2 (2C) is similar to the basic configuration of the geothermal turbine 2 (2A, 2B), and the same reference numerals as the above mentioned reference numerals are affixed and the description is not repeated. The configuration of the steam outlet 38 of the steam passage 32 of the geothermal turbine 2 (2C) is different from that of the geothermal turbine 2 (2A, 2B).

With the geothermal turbine 2 (2C) depicted in FIG. 6, the at least one seal portion 30 includes a seal portion 30A, and an inner race seal portion 30C disposed between the inner race 26 of the first-stage stationary vane 22f and the rotor 16 so as to seal leakage steam Gr that flows out inward in the radial direction of the rotor 16 from between the first-stage stationary vane 22f and the first-stage rotor blade 20f. The inner race seal portion 30C includes a rotor facing surface 42 that faces the rotor 16, an upstream surface 44 positioned on the upstream side of the rotor facing surface 42 with respect to the flow of the leakage steam Gr, and a downstream surface 46 positioned on the downstream side of the rotor facing surface 42 with respect to the flow of the leakage steam Gr. The inner race seal portion 30C has a labyrinth structure between the rotor 16 and the inner race seal portion 30C on the rotor facing surface 42, and the steam outlet 38 of the steam passage 32 is disposed on the downstream surface 46.

Also with the above configuration, there is a pressure difference across the inner race seal portion 30C, and thus it is possible to increase the pressure difference between the pressure in the gap 'g' and the pressure in the space section S1 between the first-stage rotor blade 20f and the second-stage stationary vane 22s. Thus, it is possible to supply steam stably to the steam passage 32 even if the operational conditions change, and cool the first-stage stationary vane 22f effectively.

Embodiments of the present invention were described in detail above, but the present invention is not limited thereto, and various amendments and modifications may be implemented.

Figure 7:
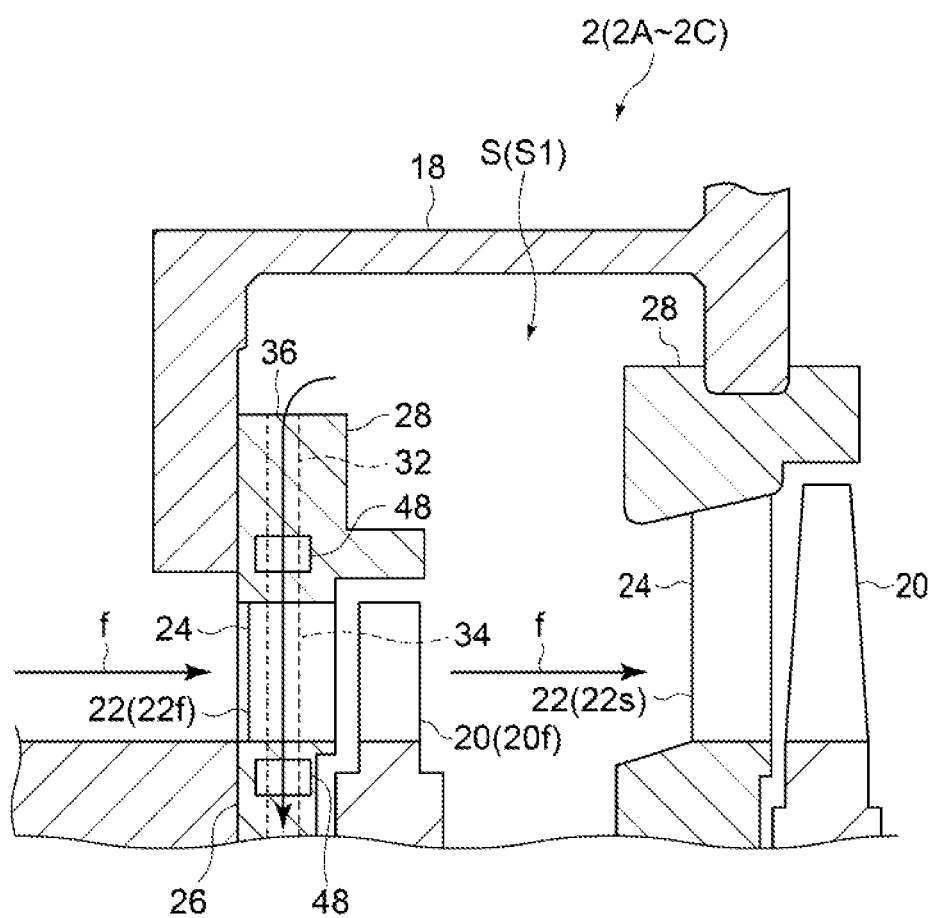
FIG. 7 is a diagram for describing the configuration of a hollow section 48.

For instance, in some embodiments, as depicted in FIG. 7, in the above described geothermal turbine 2 (2A to 2C), at least one of the inner race 26 of the first-stage stationary vane 22f or the outer race 28 of the first-stage stationary vane 22f (both in the depicted embodiment) may have an annular hollow section 48 inside thereof.

With the above configuration, by providing the annular hollow section 48 inside at least one of the inner race 26 or the outer race 28 of the first-stage stationary vane 22f, it is possible to suppress heat input to the vane body portion 24 of the first-stage stationary vane from the casing 18. Accordingly, it is possible to suppress a temperature increase of the first-stage stationary vane 22f, and suppress deposition of scales on the first-stage stationary vane 22f.

DESCRIPTION OF REFERENCE NUMERALS

2 Geothermal turbine
4 Production well
6 Separator
8 Reinjection well
10 Generator
12 Condenser
14 Cooling tower
16 Rotor
18 Casing
20 Rotor blade
20f First-stage rotor blade
22 Stationary vane
22f First-stage stationary vane
22s Second-stage stationary vane
24 Blade body portion
26 Inner race
28 Outer race
30 Seal portion
30A Seal portion
30B Inner race seal portion
30C Inner race seal portion
32 Steam passage
34 Through hole
36 Inlet opening
38 Outlet opening
40 Inner peripheral surface
42 Rotor facing surface
44 Upstream surface
46 Downstream surface
48 Hollow section
100 Geothermal power generation system

The invention claimed is:

1. A geothermal turbine, comprising:
   a rotor;
   a casing which houses the rotor;
   a plurality of rotor blades disposed around the rotor;
   a plurality of stationary vanes supported on the casing;
   at least one seal portion disposed in a gap between the rotor and the casing at an upstream side of a first-stage rotor blade of the plurality of rotor blades so as to seal leakage steam which flows out inward in a radial direction of the rotor from between a first-stage stationary vane of the plurality of stationary vanes and the first-stage rotor blade; and
   a steam passage configured to extract a part of steam after passing the first-stage stationary vane and discharge the part of steam to the gap through an interior of the first-stage stationary vane,
   wherein each of the plurality of stationary vanes includes a vane body portion and an inner race positioned at an inner side of the vane body portion in the radial direction, and
   wherein the steam passage has a steam outlet disposed on a boundary between the casing and the inner race of the first-stage stationary vane.

2. The geothermal turbine according to claim 1,
wherein the steam passage has a steam outlet disposed at a downstream side of at least one of the at least one seal portion with respect to a flow of the leakage steam.

3. The geothermal turbine according to claim 2,
wherein the at least one seal portion includes an inner race seal portion disposed between the rotor and the inner race of the first-stage stationary vane, and
wherein the steam passage has a steam outlet disposed at a downstream side of the inner race seal portion with respect to the flow of the leakage steam.

4. A geothermal turbine, comprising:
a rotor;
a casing which houses the rotor;
a plurality of rotor blades disposed around the rotor;
a plurality of stationary vanes supported on the casing;
at least one seal portion disposed in a gap between the rotor and the casing at an upstream side of a first-stage rotor blade of the plurality of rotor blades so as to seal leakage steam which flows out inward in a radial direction of the rotor from between a first-stage stationary vane of the plurality of stationary vanes and the first-stage rotor blade; and
a steam passage configured to extract a part of steam after passing the first-stage stationary vane and discharge the part of steam to the gap through an interior of the first-stage stationary vane,
wherein each of the plurality of stationary vanes includes a vane body portion and an inner race positioned at an inner side of the vane body portion in the radial direction,
wherein the at least one seal portion includes an inner race seal portion disposed between the rotor and the inner race of the first-stage stationary vane,
wherein the inner race seal portion includes a rotor facing surface which faces the rotor, an upstream surface positioned at an upstream side of the rotor facing surface with respect to a flow direction of the leakage steam, and a downstream surface positioned at a downstream side of the rotor facing surface with respect to a flow of the leakage steam, and
wherein the steam passage has a steam outlet disposed on the downstream surface.

5. The geothermal turbine according to claim 1,
wherein each of the plurality of stationary vanes includes a vane body portion, an inner race positioned at an inner side of the vane body portion in the radial direction, and an outer race positioned at an outer side of the vane body portion in the radial direction, and
wherein at least one of the inner race of the first-stage stationary vane or the outer race of the first-stage stationary vane has an annular hollow section inside thereof.

* * * * *